US008276252B2

(12) United States Patent
Liu

(10) Patent No.: US 8,276,252 B2
(45) Date of Patent: Oct. 2, 2012

(54) EXTRACTOR WITH SLIDABLE SLEEVE

(75) Inventor: Zhen-Xing Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 405 days.

(21) Appl. No.: 12/650,843

(22) Filed: Dec. 31, 2009

(65) Prior Publication Data

US 2011/0094076 A1 Apr. 28, 2011

(30) Foreign Application Priority Data

Oct. 27, 2009 (CN) .......................... 2009 1 0308891

(51) Int. Cl.
*B23P 19/04* (2006.01)
*B23B 27/14* (2006.01)

(52) U.S. Cl. ................. 29/244; 29/255; 29/252; 29/278

(58) Field of Classification Search .................... 29/244, 29/255, 252, 278
See application file for complete search history.

(56) References Cited

U.S. PATENT DOCUMENTS 5,233,740 A * 8/1993 Chen ............................... 29/252
6,895,646 B1 * 5/2005 Houg .............................. 29/252
7,216,409 B1 * 5/2007 Chiu et al. ....................... 29/259
7,980,604 B2 * 7/2011 Punaro .......................... 292/258

FOREIGN PATENT DOCUMENTS

CN 2541134 Y 3/2003

* cited by examiner

*Primary Examiner* — Monica Carter
*Assistant Examiner* — Nirvana Deonauth
(74) *Attorney, Agent, or Firm* — Altis Law Group, Inc.

(57) ABSTRACT

An exemplary extractor includes a support member, a contact member and a sleeve. The contact member is fixed on an end of the support member. The sleeve is slidably sleeved on the support member. Extraction protrusions are formed on an end of the sleeve, and a handle bar is formed on the other end of the sleeve.

10 Claims, 6 Drawing Sheets

EXTRACTOR WITH SLIDABLE SLEEVE

BACKGROUND

1. Technical Field

The present disclosure relates generally to extractors and, more particularly, to an extractor with a plurality of extraction protrusions.

2. Description of Related Art

A bearing generally has an inner sleeve and an outer sleeve. The inner sleeve and the outer sleeve are tightly fitted with other mechanical components, such as bearing housings. Thus, an extractor is required to disassemble the bearing from other mechanical components.

The extractor often includes a beam, two fixing claws, a pulling claw and a support pole. The fixing claws are hinged on opposite sides of the beam. The support pole is threaded with the beam. The support pole forms a handle bar at one end, and a tapered head portion at an opposite end. The pulling claw includes two symmetrical rotating portions. The rotating portions can cooperatively form a cavity for receiving the head portion of the support pole. The pulling claw forms a tapered surface at an inner periphery corresponding to the head portion, and a pulling sloping surface at an outer periphery. In disassembly of an engaging member from a bearing, the pulling claw is received in a through hole of the engaging member. The fixing claws are fixed to other mechanical components for positioning the extractor. The handle bar is rotated, and the support pole presses the head portion, thereby driving the rotating portions of the pulling claw to open. Then, the pulling sloping surface of the pulling claw drives the engaging member to move upwards, until the engaging member is removed from the bearing.

However, during disassembly of the engaging member from the bearing, the engaging member must slide on the pulling sloping surface of the pulling claw, and is thus easily abraded.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
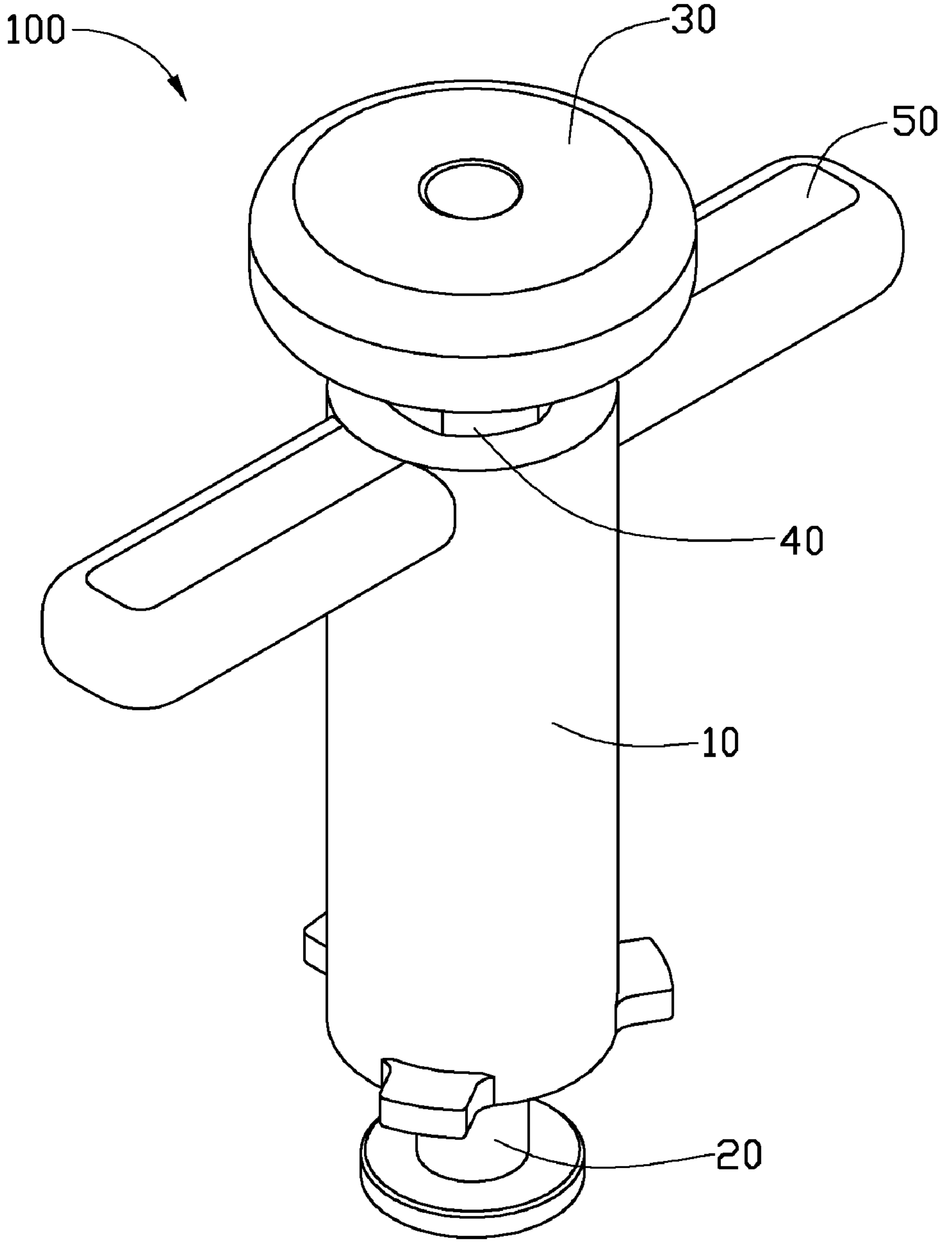
FIG. 1 is an isometric view of a first embodiment of an extractor.

Referring to FIG. 1, a first embodiment of an extractor 100 includes a sleeve 10, a support member 20, a contact member 30, a fastening member 40, and a handle bar 50. The sleeve 10 is slidably sleeved on the support member 20. The contact member 30 is fixed on an end of the support member 20. The fastening member 40 engages the support member 20, and is positioned between the sleeve 10 and the contact member 30. The handle bar 50 is fixed on a top end of the sleeve 10 adjacent to the contact member 30.

Figure 2:
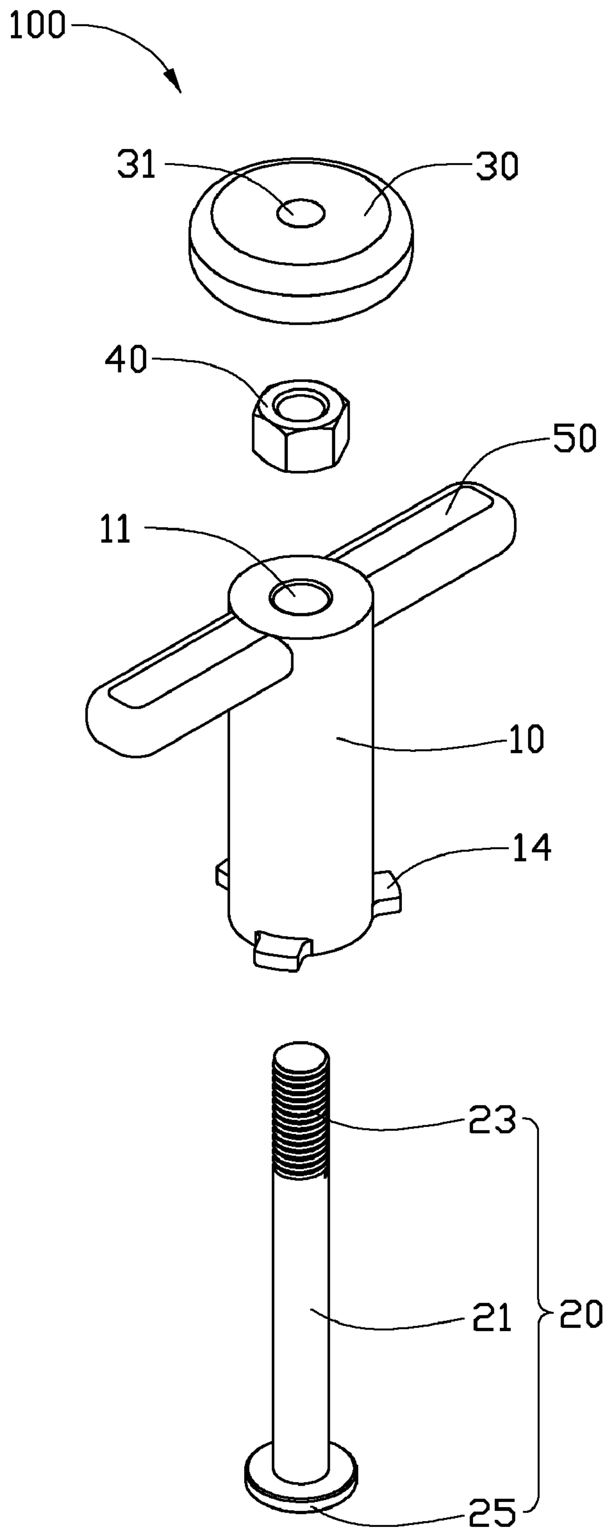
FIG. 2 is an exploded view of the extractor of FIG. 1.

Referring to FIG. 2, the sleeve 10 is substantially cylindrical, and defines a circular through hole 11 corresponding to the support member 20. The sleeve 10 forms one or more extraction protrusions 14 at a bottom end thereof. In the illustrated embodiment, the sleeve 10 forms three extraction protrusions 14. The three extraction protrusions 14 are uniformly arranged around a circumference of the bottom end of the sleeve 10, and integrally formed with the sleeve 10.

The support member 20 includes a cylindrical main body 21, a threaded portion 23, and a step portion 25. The threaded portion 23 and the step portion 25 extend from opposite sides of the main body 21. The sleeve 10 is rotatably sleeved on the support member 20, with the bottom end of the sleeve 10 adjacent to the step portion 25.

The contact member 30 is substantially cylindrical, and defines a threaded hole 31 through a center thereof. The fastening member 40 and the contact member 30 are threaded onto the threaded portion 23 of the support member 20. In the illustrated embodiment, the fastening member 40 is a nut. It should be pointed out that, in other embodiments, the fastening member 40 can be omitted.

Figure 3:
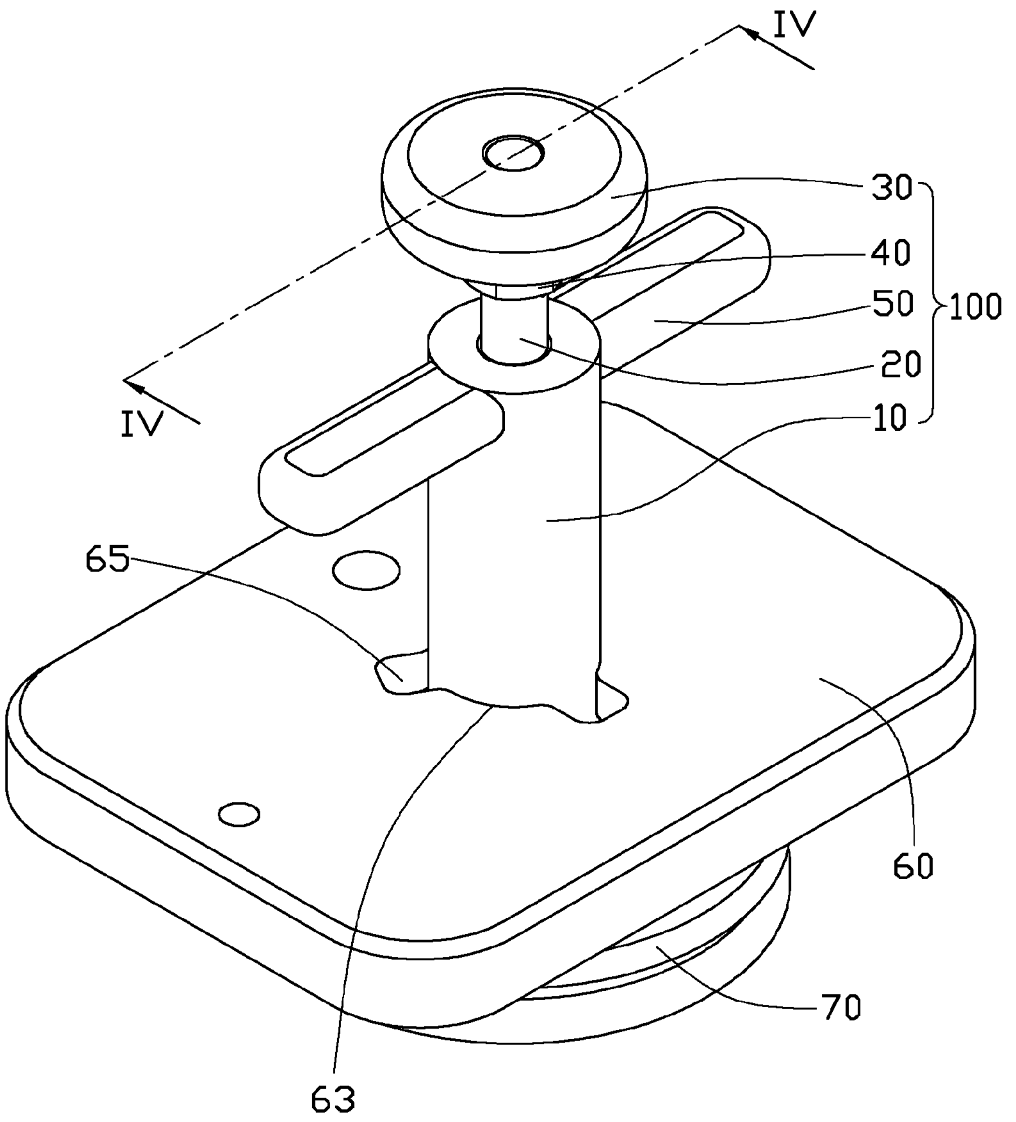
FIG. 3 is an isometric view of the extractor of FIG. 1, disassembling an engaging member from a base.
Figure 4:
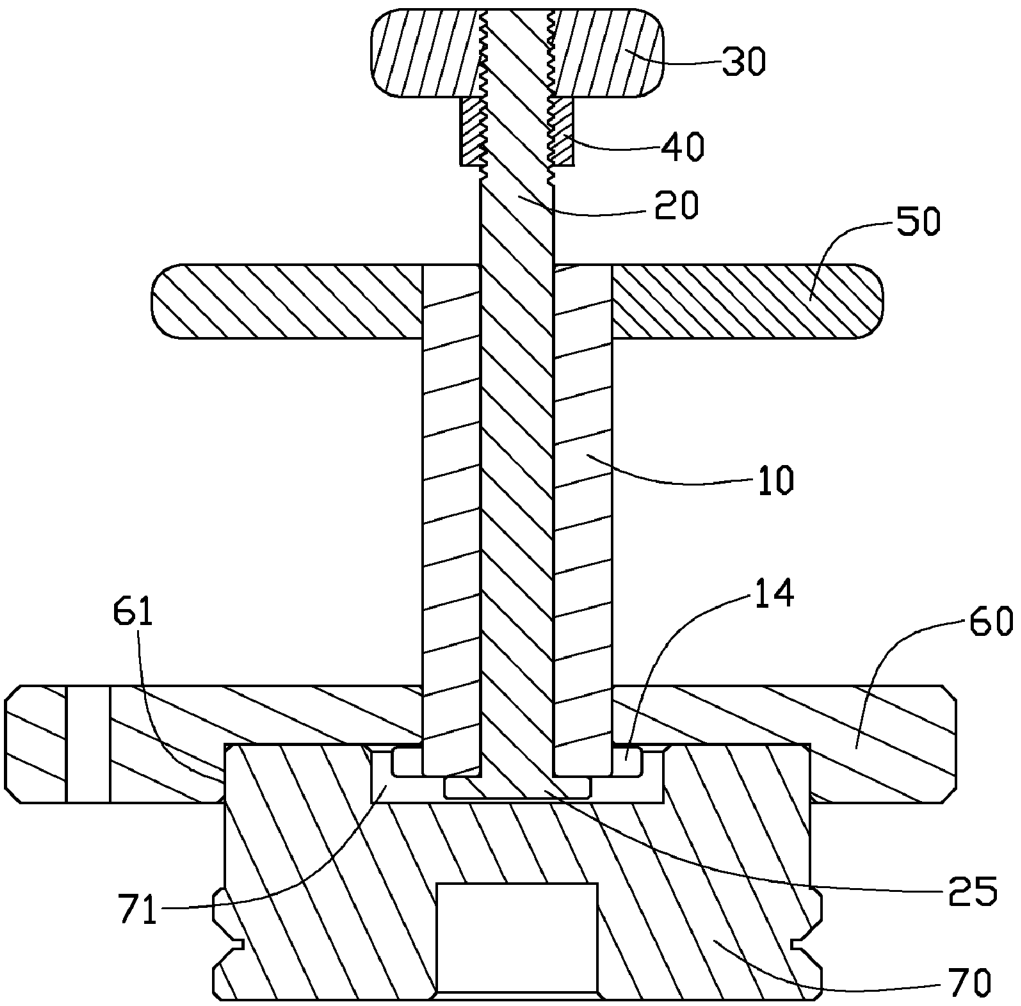
FIG. 4 is a side cross-section of the extractor, the engaging member and the base of FIG. 3, taken along line IV-IV thereof.

Referring to FIGS. 3 and 4, an engaging member 60 detachably and tightly fits to a base 70. The engaging member 60 defines an engaging groove 61 in a center of a bottom surface thereof, and a circular through hole 63 in a top surface thereof, the through hole 63 communicating with the engaging groove 61. The engaging member 60 further defines three cutouts 65 around the through hole 63 corresponding to the extraction protrusions 14. The base 70 defines an assembly groove 71 in a center thereof. During assembly of the engaging member 60 with the base 70, the base 70 is partially and tightly received in the engaging groove 61 of the engaging member 60.

During disassembly of the engaging member 60 from the base 70, the sleeve 10 extends through the through hole 63 of the engaging member 60, with the extraction protrusions 14 extending through the cutouts 65, until the step portion 25 of the support member 20 resists a bottom wall defining the assembly groove 71. The handle bar 50 is rotated until the extraction protrusions 14 press the engaging member 60. The contact member 30 is pushed, and the handle bar 50 is simultaneously pulled, such that the sleeve 10 slides relative to the support member 20, and the extraction protrusions 14 push the engaging member 60 away from the base 70 until the engaging member 60 is entirely detached from the base 70.

The extractor 100 utilizes the extraction protrusions 14 to directly push the engaging member 60 away from the base 70, and the extraction protrusions 14 do not require rotating in the disassembly process. Therefore, the engaging member 60 is protected from abrasion by the extractor 100.

Figure 5:
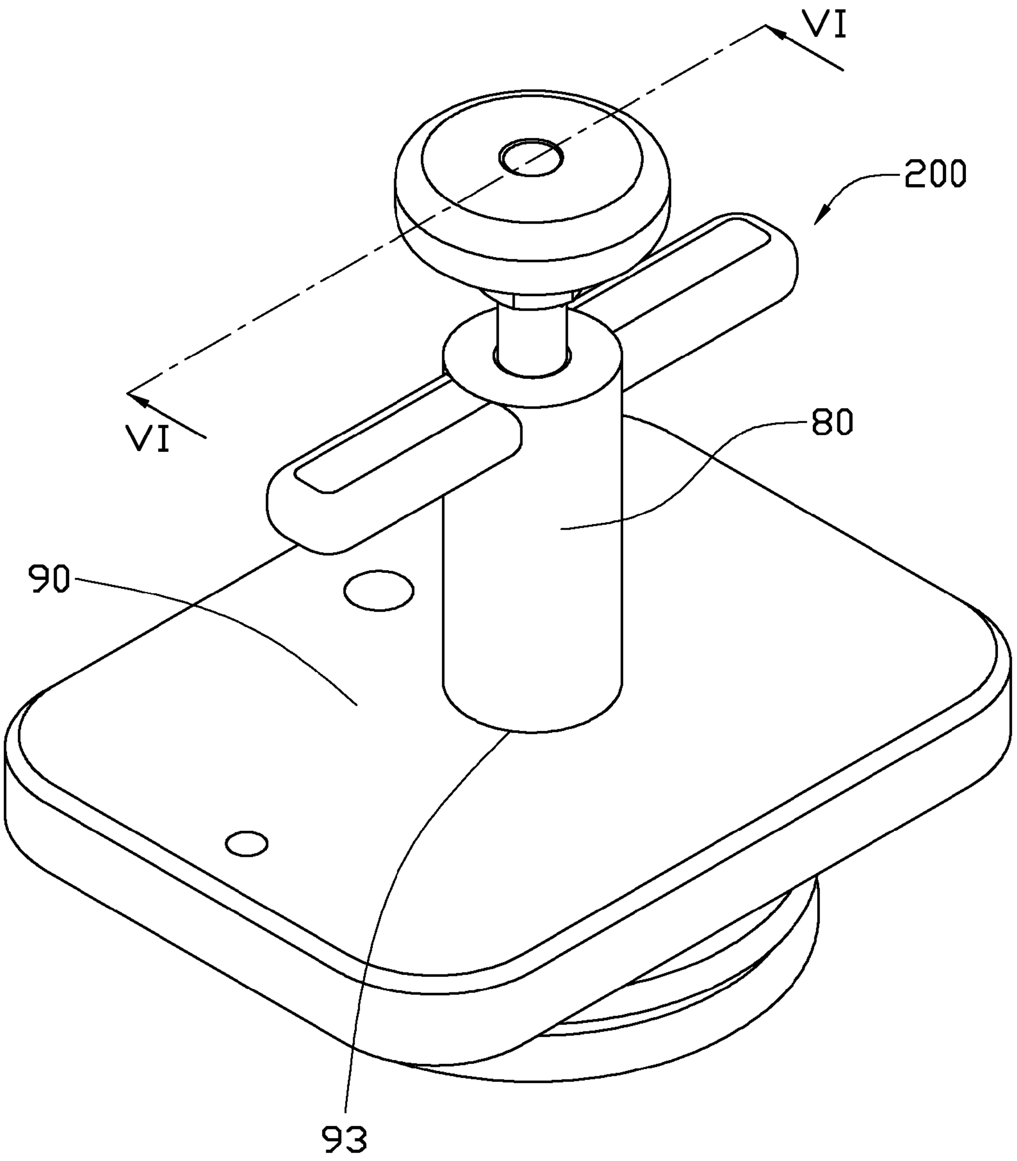
FIG. 5 is an isometric view of a second embodiment of an extractor, disassembling an engaging member from a base.
Figure 6:
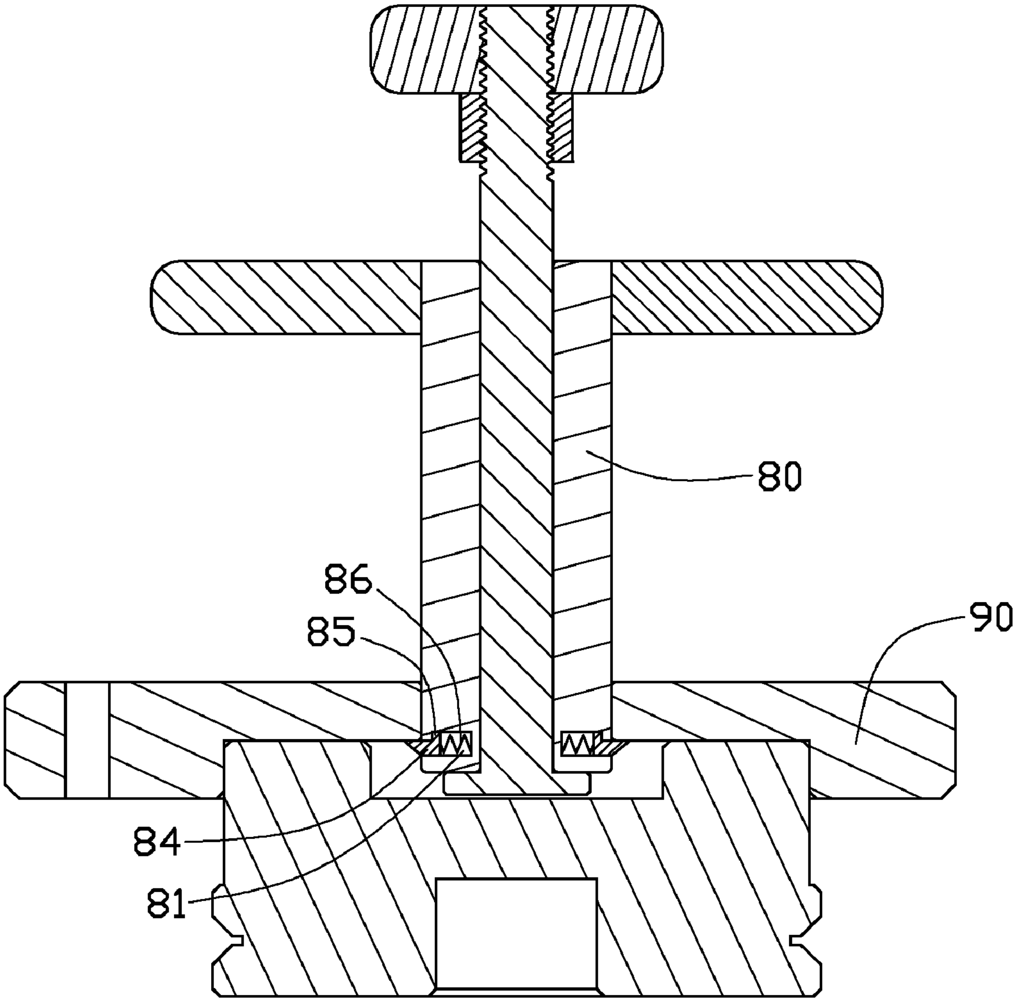
FIG. 6 is a side cross-section of the extractor, the engaging member and the base of FIG. 5, taken along line VI-VI thereof.

Referring to FIGS. 5 and 6, a second embodiment of an extractor 200 differs from the extractor 100 only in that a plurality of extraction protrusions 84 is detachably assembled to a sleeve 80. The sleeve 80 defines one or more receiving grooves 81 at a bottom end thereof. In the illustrated embodiment, the sleeve 80 defines three receiving grooves 81. Each extraction protrusion 84 is substantially wedge-shaped, and received in one corresponding receiving groove 81. The extraction protrusion 84 forms a step portion 85, thus preventing the extraction protrusion 84 disengaging from the sleeve 80. An elastic member 86 is positioned in each receiving groove 81, between the extraction protrusion 84 and the sleeve 80. In the illustrated embodiment, the elastic member

86 is a compression spring. Therefore, the extraction protrusions 84 can be fully received in receiving grooves 81 of the sleeve 80 when the elastic members 86 are compressed, and can be driven to protrude out of the receiving grooves 81 by elastic rebounding force of the elastic members 86. In use, the bottom end of the sleeve 80 can be inserted through a circular engaging hole 93 of an engaging member 90, with the extraction protrusions 84 entirely received in the receiving grooves 81 of the sleeve 80 during such insertion. Once the extraction protrusions 84 have completely passed through the engaging hole 93, the extraction protrusions 84 are pushed by the elastic members 86 to protrude out of the sleeve 80.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An extractor, comprising:

a support member;

a contact member fixed on a top end of the support member;

a sleeve slidably sleeved on the support member;

at least one extraction protrusion formed on a bottom end of the sleeve; and a handle bar formed on a top end of the sleeve;

wherein the sleeve defines at least one receiving groove in which the at least one extraction protrusion is received; the extractor further comprises at least one elastic member received in the at least one receiving groove, and positioned between the at least one extraction protrusion and the sleeve; a step portion is formed on each of the at least one extraction protrusions, thus preventing the at least one extraction protrusion from disengaging from the at least one receiving groove of the sleeve.

2. The extractor of claim 1, wherein the at least one elastic member is a compression spring.

3. The extractor of claim 1, wherein the at least one extraction protrusion is substantially wedge-shaped.

4. The extractor of claim 1, wherein the support member comprises a main body and a threaded portion formed on a top end of the main body; the contact member defines a threaded hole, and the threaded portion is engaged in the threaded hole of the contact member.

5. The extractor of claim 4, wherein the support member further forms a step portion on a bottom end of the main body.

6. The extractor of claim 5, further comprising a fastening member threaded on the threaded portion of the support member, and positioned between the contact member and the sleeve.

7. The extractor of claim 1, wherein the at least one extraction protrusion is a plurality of extraction protrusions, which are uniformly arranged around a periphery of the bottom end of the sleeve.

8. The extractor of claim 7, wherein the plurality of extraction protrusions is three extraction protrusions.

9. The extractor of claim 1, wherein each of the at least one extraction protrusion is integrally formed with the sleeve.

10. An extractor, comprising:

a support member;

a contact member fixed on a top end of the support member;

a sleeve slidably sleeved on the support member;

at least one extraction protrusion formed on a bottom end of the sleeve; and a handle bar formed on a top end of the sleeve;

wherein the support member comprises a main body, a threaded portion formed on a top end of the main body, and a step portion formed on a bottom end of the main body; the contact member defines a threaded hole, and the threaded portion is engaged in the threaded hole of the contact member; the extractor further comprises a fastening member threaded on the threaded portion of the support member, and positioned between the contact member and the sleeve.

* * * * *